(12) United States Patent
Lampert et al.

(10) Patent No.: US 7,340,146 B2
(45) Date of Patent: Mar. 4, 2008

(54) DUST SHUTTER FOR AN OPTICAL ADAPTER

(75) Inventors: Norman Roger Lampert, Norcross, GA (US); Wayne Lloyd Lewis, Tokyo (JP)

(73) Assignee: Yazaki Corporation, Tokyo (JP)

( * ) Notice: Subject to any disclaimer, the term of this patent is extended or adjusted under 35 U.S.C. 154(b) by 253 days.

(21) Appl. No.: 11/076,029

(22) Filed: Mar. 10, 2005

(65) Prior Publication Data
US 2006/0204200 A1    Sep. 14, 2006

(51) Int. Cl.
*G02B 6/00* (2006.01)
*G02B 6/36* (2006.01)

(52) U.S. Cl. .................... 385/139; 385/53; 385/77; 385/134

(58) Field of Classification Search .......... 385/53, 385/77, 139, 134
See application file for complete search history.

(56) References Cited

U.S. PATENT DOCUMENTS

| | | |
|---|---|---|
| 5,506,922 A | 4/1996 | Grois et al. |
| 6,247,849 B1 * | 6/2001 | Liu .............................. 385/55 |
| 6,354,746 B1 * | 3/2002 | Lee .............................. 385/77 |
| 6,425,694 B1 | 7/2002 | Szilagyi et al. |
| 6,508,593 B1 | 1/2003 | Farnsworth et al. |
| 6,695,485 B1 * | 2/2004 | Estrella et al. ................. 385/53 |
| 7,029,322 B2 * | 4/2006 | Ernst et al. .................. 439/544 |

* cited by examiner

*Primary Examiner*—Frank G. Font
*Assistant Examiner*—Michael P. Mooney
(74) *Attorney, Agent, or Firm*—Sughrue Mion, PLLC

(57) ABSTRACT

A dust shutter for an optical adapter, includes a collar, wherein the collar is capable of being provided around an end of the optical adapter; a cover; a hinge that connects the cover to the collar; the hinge configured such that the cover can be provided in an open position and a closed position with respect to the collar; and a latch provided on the cover that attaches the cover to the collar in the closed position; wherein the collar, the cover, the hinge, and the latch form a unitary structure.

19 Claims, 9 Drawing Sheets

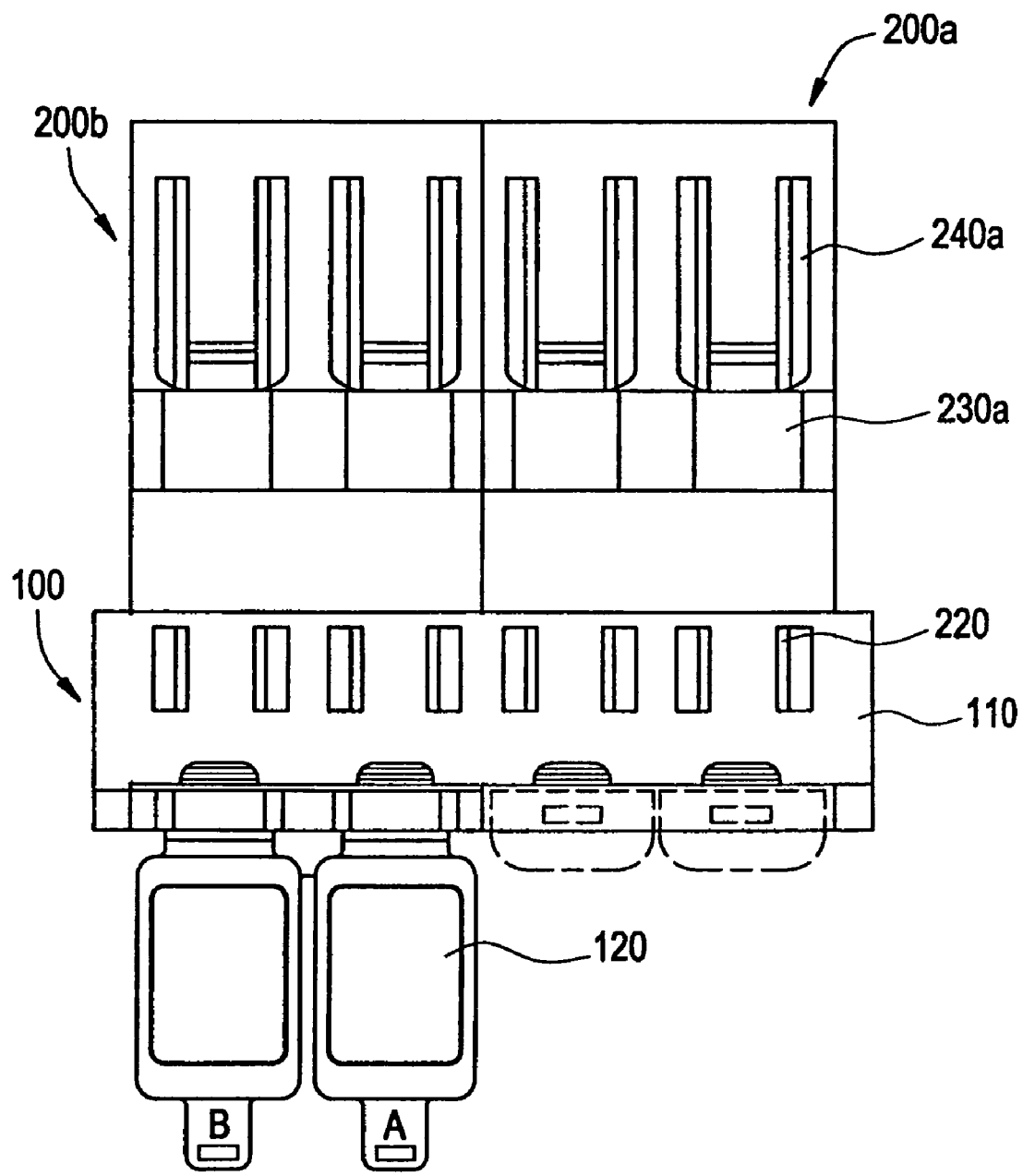

DUST SHUTTER FOR AN OPTICAL ADAPTER

FIELD OF THE INVENTION

The present invention relates to a dust shutter for an optical adapter.

BACKGROUND

Optical adapters provide a connection between optical fibers of an optical fiber communication system. Two optical connectors, which are provided at ends of two optical fiber cables, are latched to the optical adapter, in order to provide a coupling between the ends of the optical fibers within the optical fiber cables. Each adapter has at least one set of opposing ports to accept the connectors on the optical fiber cables. This allows the light passing through one of the optical fiber cables to be transmitted through the other optical fiber cable. The optical adapter is formed by back-to-back receptacles, each receptacle configured to accept the optical fiber cable. The receptacle could also be a device receptacle where the optical fiber cable connector is mated to the front side of the receptacle and a device can be positioned on the backside of the receptacle. Various types of optical connectors are commonly coupled using optical adapters, including but not limited to LC connectors.

When the optical connectors are not latched to the optical adapter, cavities in the optical adapter, which are provided for coupling the optical connector, are susceptible to dust or debris. This can affect the performance of the optical connection between the mating connectors, and even prevent the connector and the device from functioning properly. Moreover, the light of a laser beam typically used for optical transmission in high-power applications can damage the eyes of an individual that installs or repairs the optical fiber connection. Accordingly, it is beneficial to provide the optical adapter with some form of cover.

Traditionally, a removable plug or dust cap has been used to close off the opening. However, the removable plug can be easily misplaced. Insertion and removal of the plug may also require considerable manual dexterity on the part of the individual that installs or repairs the optical fiber connection. It is also not possible to configure a removable plug that automatically closes the opening upon removal of the optical connector, should such automatic closing be desired.

U.S. Pat. No. 6,247,849, issued to Liu, describes a dust shutter for a fiber coupler that includes a casing provided with a spring biased covering lid. However, this covering lid does not form a tight seal to prevent the ingress of dust. In addition, the covering lid is made of multiple pieces, which increases the cost and reduces the reliability of the dust shutter.

Moreover, a typical adapter includes holes provided at both connection ends of the optical adapter at top and bottom faces of the adapter. U.S. Pat. No. 6,247,849's dust shutter casing has openings that form anchoring tabs at the top and bottom of the casing. The anchoring tabs are used to provide a connection between the dust shutter and the adapter. Accordingly, U.S. Pat. No. 6,247,849's dust shutter would not properly seal the holes on a typical adapter because the top and bottom of the dust shutter casing includes openings that form the anchoring tabs.

Finally, because the covering lid dust shutter of U.S. Pat. No. 6,247,849 is spring loaded, the covering lid will not remain in the open position unless it is held open by some external force. This can be inconvenient to individuals engaged in connector installation because the covering lid must be manually retained in the open position during connector insertion.

The present invention is directed to overcoming one or more of the deficiencies in prior art dust protection devices discussed above.

SUMMARY OF THE INVENTION

According to a first aspect of the invention, a dust shutter for an optical adapter, includes a collar, wherein the collar is capable of being provided around an end of the optical adapter; a cover; a hinge that connects the cover to the collar; the hinge configured such that the cover can be provided in an open position and a closed position with respect to the collar; and a latch provided on the cover that attaches the cover to the collar in the closed position; wherein the collar, the cover, the hinge, and the latch form a unitary structure.

According to a second aspect of the invention, a dust shutter for an optical adapter, includes a collar, wherein the collar is capable of being provided around an end of the optical adapter; a plurality of covers; a plurality of hinges, wherein each of the hinges connects a corresponding cover of the plurality of covers to the collar; each of the hinges configured such the corresponding cover can be provided in an open position and a closed position; and a plurality of latches, each of said latches being provided on a corresponding cover of the plurality of covers, and each of said latches attaches the corresponding cover to the collar in the closed position; wherein the collar, the covers, the hinges, and the latches form a unitary structure.

According to a third aspect of the invention, a combination includes at least one optical port and at least one dust shutter, each of said at least one dust shutter including a collar, wherein the collar is capable of being provided around an end of the optical adapter or receptacle; a plurality of covers; a plurality of hinges, wherein each of the hinges connects a corresponding cover of the plurality of covers to the collar; each of the hinges configured such the corresponding cover can be provided in an open position and a closed position; and a plurality of latches, each of said latches being provided on a corresponding cover of the plurality of covers, and each of said latches attaches the corresponding cover to the collar in the closed position; wherein the collar, the covers, the hinges, and the latches form a unitary structure.

BRIEF DESCRIPTION OF THE DRAWINGS

The advantages, nature and various additional features of the invention will appear more fully upon consideration of the illustrative embodiment of the invention which is schematically set forth in the accompanying drawings.

FIG. 7b is a side view of the dust shutter of FIG. 7a.

FIG. 9 is a top view of the dust shutter and an optical adapter according to the second exemplary embodiment.

DETAILED DESCRIPTION OF THE EXEMPLARY EMBODIMENTS

Figure 1:
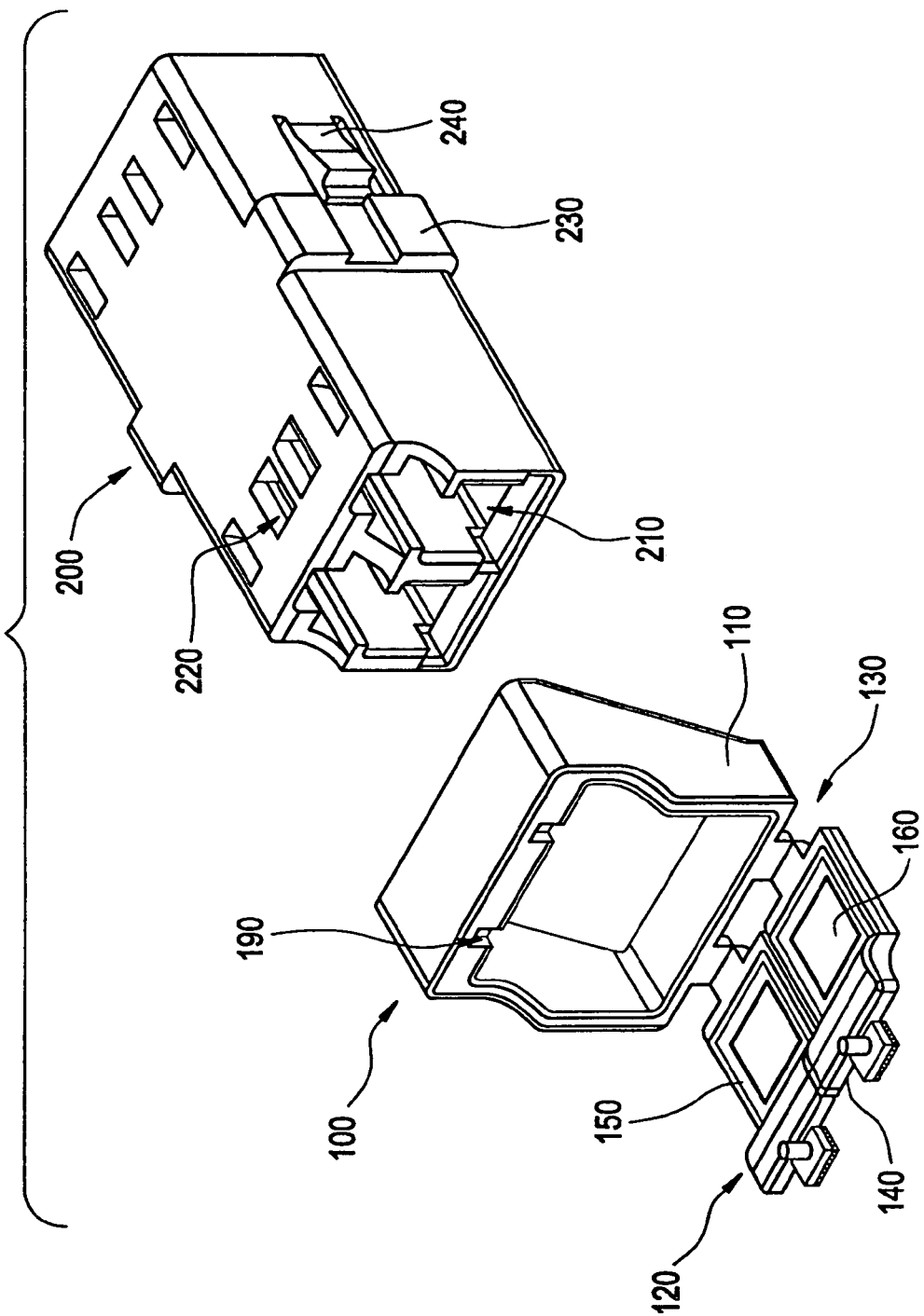
FIGS. 1 and 2 are perspective views of a dust shutter and an optical adapter according to a first exemplary embodiment of the invention.

While the invention is open to various modifications and alternative forms, specific embodiments thereof are shown by way of examples in the drawings and are described herein in detail. There is no intent to limit the invention to the particular forms disclosed.

Figure 2:
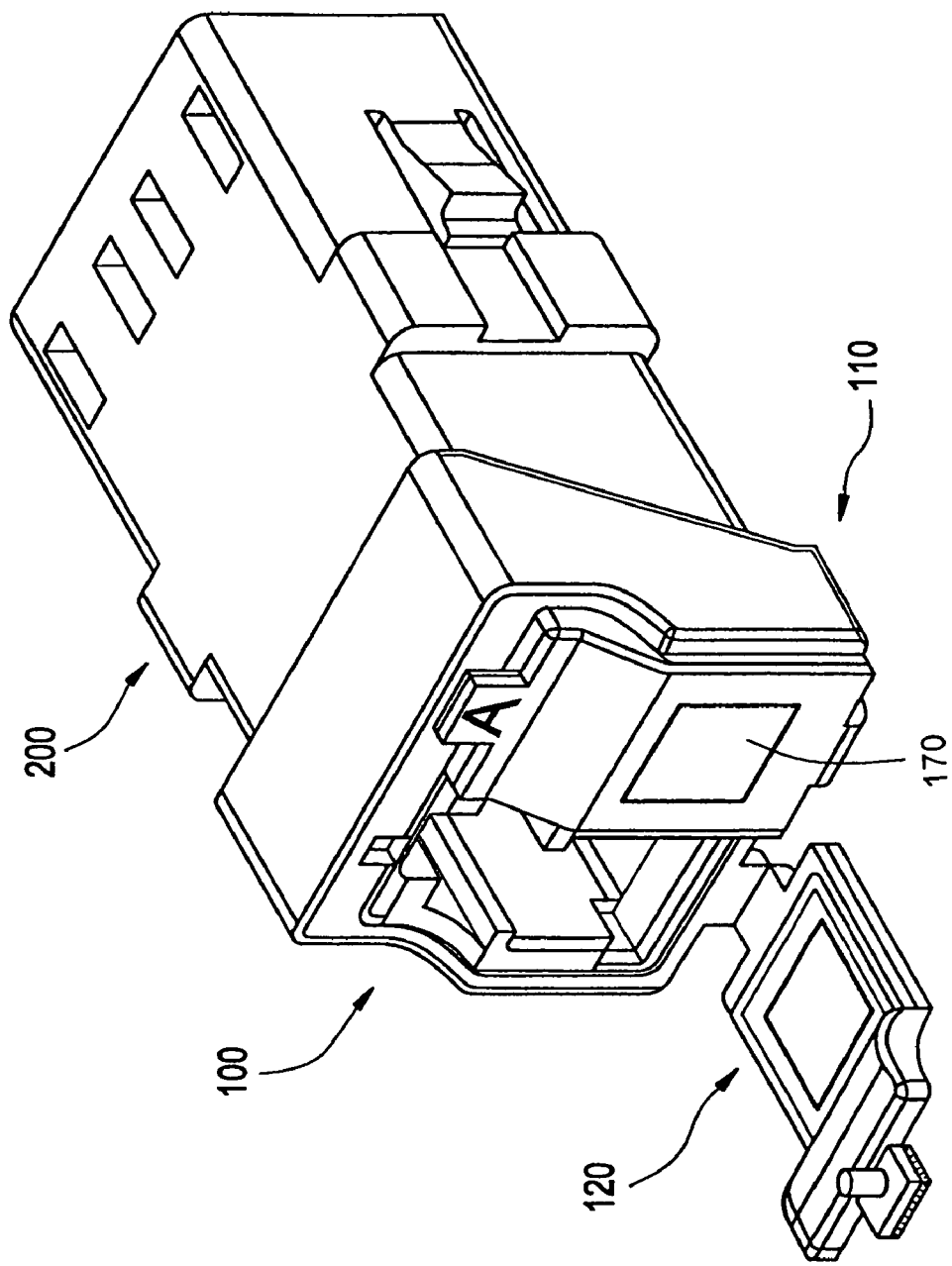
Figure 3:
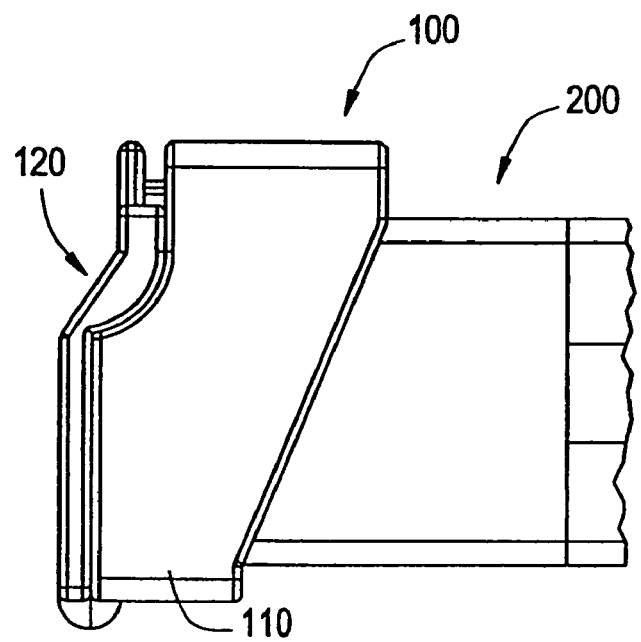
FIGS. 3 and 4 are a side view and front view, respectively, of the dust shutter and the optical adapter or receptacle according to the first exemplary embodiment.
Figure 4:
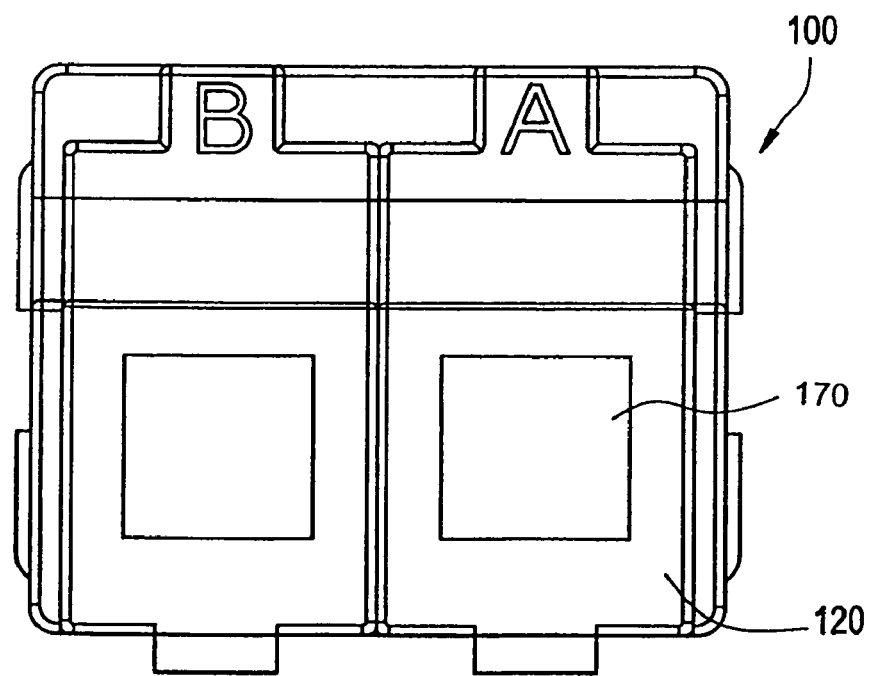
Figure 5A:
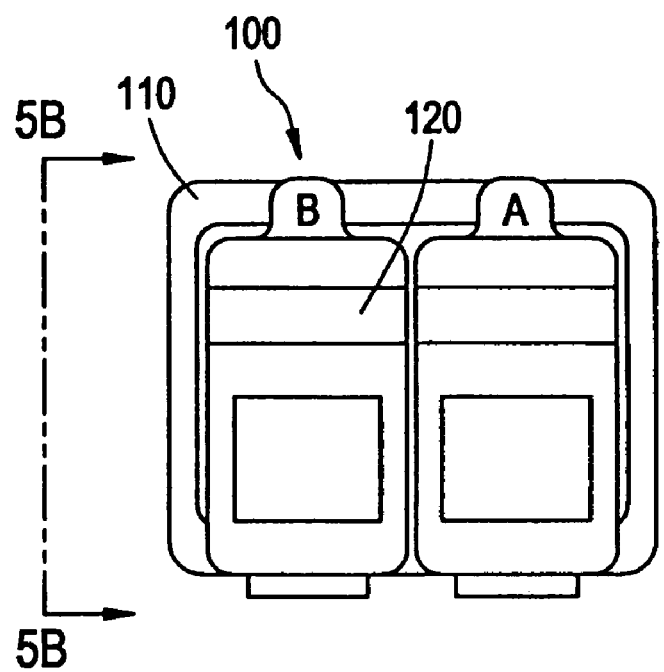
FIG. 5*a* is a front view of the dust shutter of the first exemplary embodiment in which the covers are in closed positions.
Figure 5B:
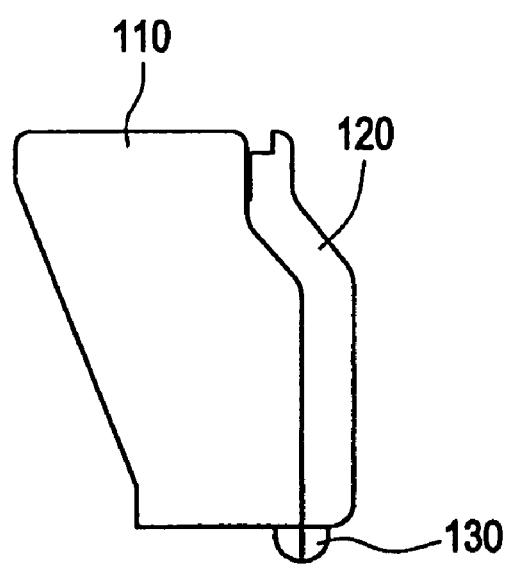
FIG. 5*b* is a side view of the dust shutter taken along the perspective line 5*b*-5*b* in FIG. 5*a*.

A first exemplary embodiment of the invention is shown in FIGS. 1-6b. FIGS. 1 and 2 are perspective views of a dust shutter 100 and an optical adapter 200. FIGS. 3 and 4 are side and front views, respectively, of the dust shutter 100 and the optical adapter 200. FIGS. 5a-6b show details of the cover 120 and a latch 140 of the dust shutter 100.

As shown in FIGS. 1 and 2, the dust shutter 100 includes a collar 110 and one or more covers 120. Hinges 130 connect the covers 120 to the collar 110 and allow the covers 120 to be provided in either an open position or a closed position with respect to the collar 110, as shown with respect to covers 120 of FIG. 2.

When each cover 120 is in the open position, an individual can access a corresponding optical connector port or cavity 210 of the optical adapter 200. When the cover 120 is in the closed position, the corresponding optical connector cavity 210 cannot be accessed; and the interior of the optical adapter 200 is protected from dust. Moreover, when the cover 120 is in a closed position, individuals are protected from laser light leaking from optical fibers connected from the rear-side to the optical adapter 200.

Latches 140, provided on the covers 120, are capable of attaching the covers 120 to the collar 110, so that the covers 120 are in closed positions. Each of the latches 140 is attached to a corresponding latch receptacle 190 in the collar 110. Details of the latches 140 and latch receptacles 190 are shown in FIGS. 5a-6b, and discussed below.

The dust shutter 100 is a one-piece molded structure. That is, the collar 110, cover 120, hinge 130, and latch 140, form a unitary structure. The unitary structure can be a one piece design made from nylon and having a living hinge 130. This greatly reduces manufacturing costs and increases the reliability of the dust shutter 100.

The optical adapter 200 of the first exemplary embodiment shown in FIGS. 1-4 is provided for an LC optical connector application; however, the invention is not limited to this type of connector. The optical adapter 200 is provided with flanges 230 and panel latches 240. These flanges 230 and panel latches 240 are provided to secure the optical adapter 200 within a panel (not shown).

FIGS. 5a-6b show details of a latch 140 of this exemplary embodiment. Each latch 140 includes a latch finger 140a of a length "x." The latch finger 140a includes a latch protrusion 140b. The latch finger 140a is provided at a side of the corresponding cover 120 opposite the side with the corresponding hinge 130. The collar 110 includes one or more latch receptacles 190. The latch receptacle 190, which is formed in a top, interior face of the collar 110, is provided with a dimple 190a. The latch protrusion 140b and the dimple 190a could be reversed such that the dimple could be in the latch 140 and the protrusion could be in the latch receptacle 190.

In order to attach each cover 120 to the collar 110, and therefore provide protection from dust and light, the latch finger 140a is inserted into the latch receptacle 190. When the latch finger 140a is properly inserted, the latch protrusion 140b is inserted into the dimple 190a, and the cover 120 is secured to the collar 110.

Figure 6A:
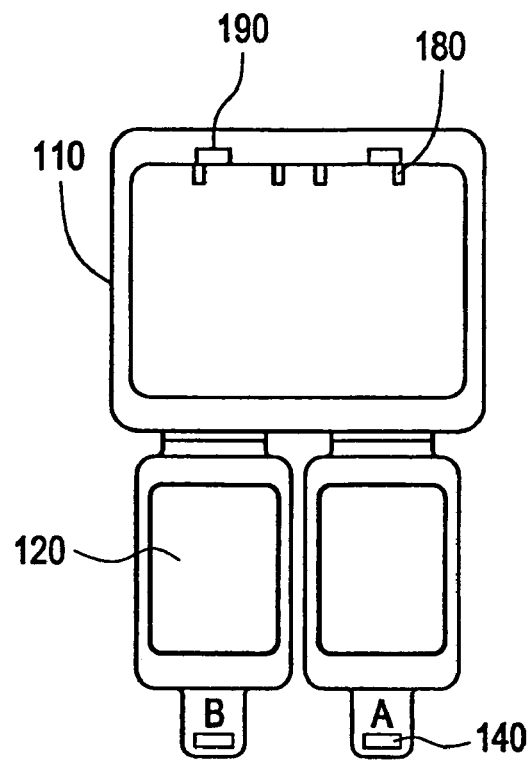
FIG. 6a is a front view of the dust shutter of the first exemplary embodiment in which the covers are in an open positions.
Figure 6B:
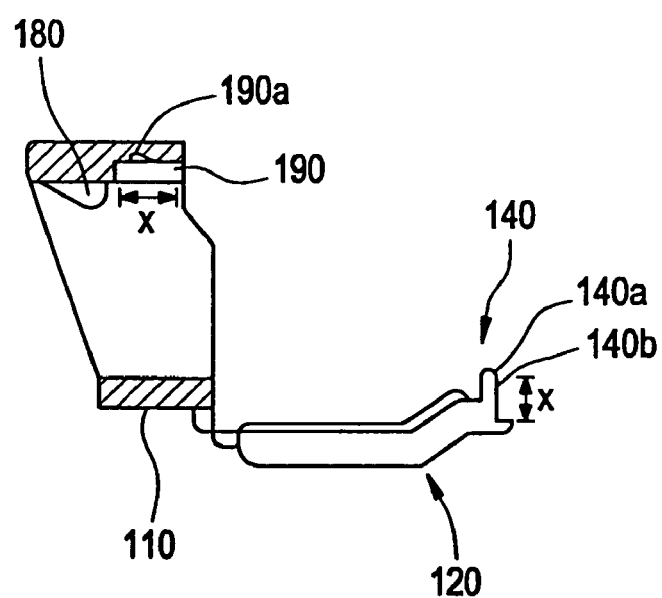
FIG. 6b is a sectional view of the dust shutter of FIG. 6a with the cover open at 90°.
Figure 7A:
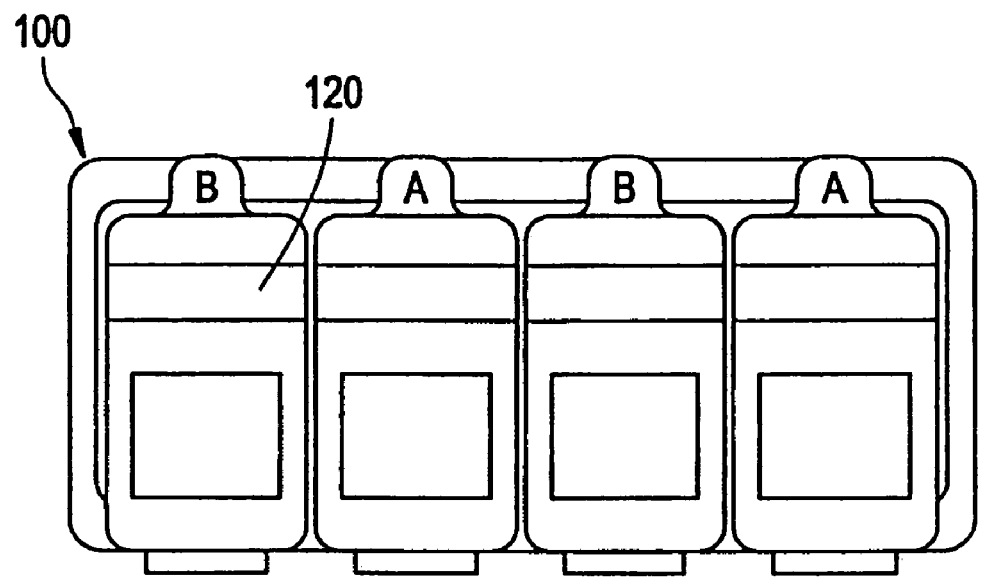
FIG. 7a is a front view of the dust shutter of a second exemplary embodiment in which the covers are in closed positions.
Figure 7B:
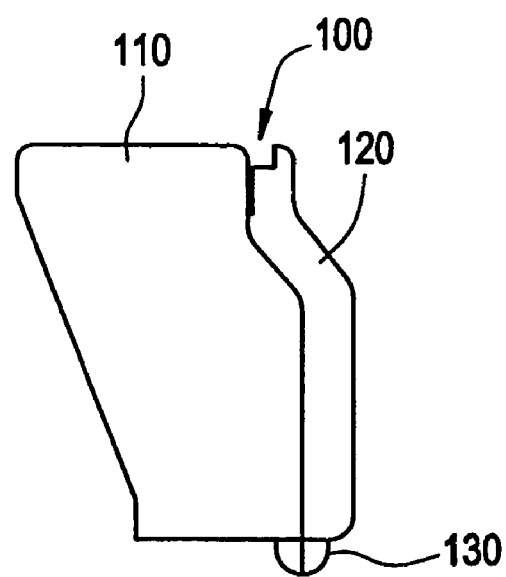
Figure 8A:
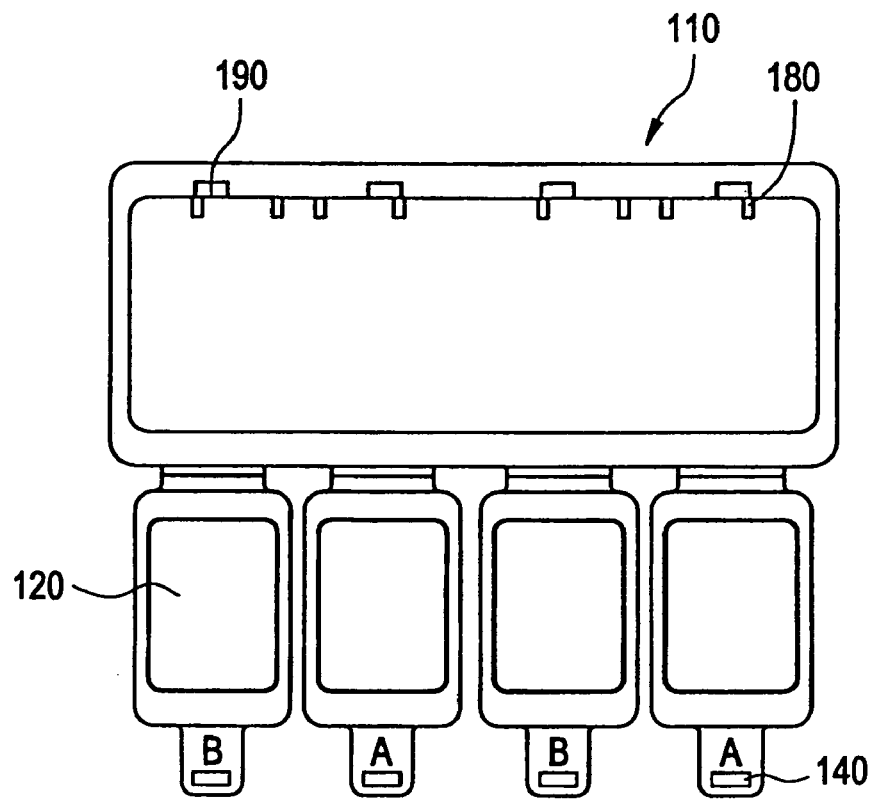
FIG. 8a is a front view of the dust shutter of the second exemplary embodiment in which the covers are in open positions.
Figure 8B:
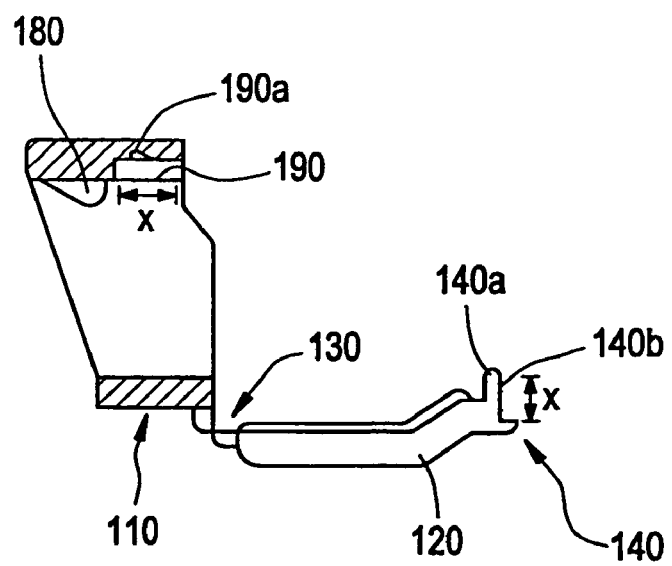
FIG. 8b is a sectional view of the dust shutter of FIG. 8a with the cover open at 90°.

Moreover, as shown in FIGS. 6a and 6b, ramped retention fingers 180, or keys, can be molded at a top, interior face of the collar 110. These retention fingers 180 are provided in order to attach the collar 110, and therefore the dust shutter 100, to holes 220 provided in a top face of the optical adapter 200. With this configuration, the dust shutter 100 can be installed to the optical adapter 200 with a light, press fit.

The holes 220 in the top of the optical adapter 200 allow mold-tools cores to be extended through the holes 220 in order to provide create latch retaining walls in the interior of the adapter 200. When the dust shutter 100 is provided on the optical adapter 200, the collar 110 seals these holes 220.

The exemplary embodiment of the dust shutter 100 provides the dual functions of preventing light leakage and preventing the ingress of dust or other contaminants into the optical adapter 200.

The dust shutter 100 according to the exemplary embodiments of the invention is used to protect against the leakage of emitted light from a light emitting diode (LED), a laser diode (LD), or another light emitting device. For example, the dust shutter 100 can prevent the leakage of light from an optical connector that is attached to the optical adapter 200, but does not terminate at another optical connector.

As shown in FIG. 1, a label 160 can be added to the inside and/or outside of the cover 120 of the dust shutter 100 in order to prevent light-leakage. The label 160 can be a metal insert sheet or an opaque label. That is, a piece of metal, such as aluminum, could be snapped or adhesively bonded to the inside and/or outside of the cover 110 in order to prevent leakage of light. The label 160 can also provide a safety warning and/or a numbering of the cover 110.

The material that serves as the cover also can afford a certain degree of attenuation further reducing the exit power from the device or connector in the rear of the adapter.

At least one rib 150 can be provided on inner surface of the cover 110. In the exemplary embodiment shown in FIG. 1, the at least one rib 150 is several ribs that form a well that allows alignment and/or retention of a label 160. Moreover, a depression 170 provided on the outside surface of the dust shutter 100 forms a well, which allows for the alignment and/or retention of a label 160 on the outside of the cover 120.

As discussed above, the dust shutter 100 serves to seal the optical adapter 200 from airborne dust by forming a tight seal to prevent the ingress of dust or other contaminants into the adapter cavities 210. In addition to assisting with the retention of the label 160, the at least one internal rib 15 provided on the inside of the cover 110 improves the quality of this seal.

The exemplary embodiment shown in FIGS. 1-6b is a dust shutter provided for a duplex-type adapter, i.e., an optical adapter 200 that provides two connections between optical connectors. However, the invention is not limited to this structure and is also applicable to a simplex adapter (i.e., one connection), or an adapter with more than two connections between optical connectors. A standard LC adapter is commonly provided in two basic configurations. A configuration containing a single port capable of accepting one single fiber connector (i.e., in a simplex adapter), and a configuration containing two ports, each port of which is capable of accepting one, single optical fiber connector (i.e., in a duplex adapter). In actual practice, it is sometimes desirable to have a configuration with more than two ports. Some manufacturers have responded to this by producing adapters containing four ports, each of which is capable of accepting one, single fiber connector (i.e., a quad adapter). However, as the number of ports increases, it becomes increasingly difficult to maintain the proper molding tool tolerances. Furthermore, a different molding tool is required to mold each of these adapters.

Furthermore, it is possible to use this dust shutter on the device receptacle, for example a transceiver where duplex ports side-by-side can allow a duplex connector to simultaneously connect to a transmitting device such as a LED or LD and a second device such as an optical receiver.

The second exemplary embodiment of the present invention shown in FIGS. 7a-9 addresses this problem by enabling multiple duplex adapters to be held together in a linear configuration, or array. As shown in FIG. 9, the collar 110 of the dust shutter 100 can also group multiple optical adapters 200a, 200b together to provide a module or array with multiple ports. Therefore, the multiple adapters 200a, 200b can be grouped together prior to installation in a panel (not shown).

In the exemplary embodiment shown in FIGS. 7a-9, the collar 110 is used to create a high port count adapters by joining two duplex adapters to form a four port (i.e., quad type) array, but the invention is not limited in this respect. For example, six port, eight port (i.e., octal adapter), or higher combinations of duplex adapters are possible. Also, multiple simplex adapters can be joined together.

In the first exemplary embodiment of the present invention shown in FIGS. 1-6b the flange 230 and panel latches 240 are located at sides of the optical adapters. However, for the second exemplary embodiment, as shown in FIG. 9, when the collar 110 is used to join multiple optical adapters, the flanges 230a and panel latches 240a are instead located on the top and bottom of the optical adapters 200a, 200b. In normal use, the back side of the adapters are equipped with connectors, such as inside a wall outlet, inside an optical circuit pack, or on the backside of a panel that holds the adapters.

Figure 10A:
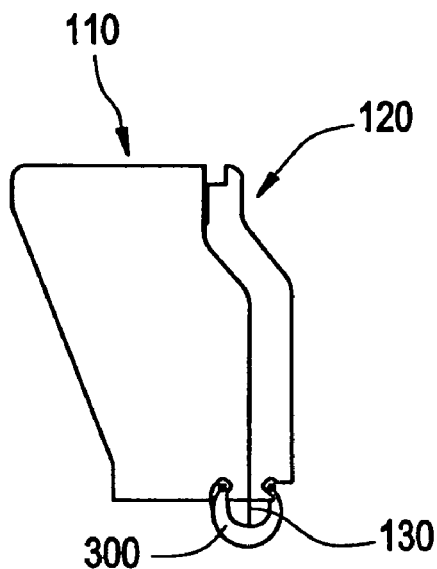
FIG. 10a is a side view of a dust shutter having a spring according to a third exemplary embodiment of the invention.
Figure 10B:
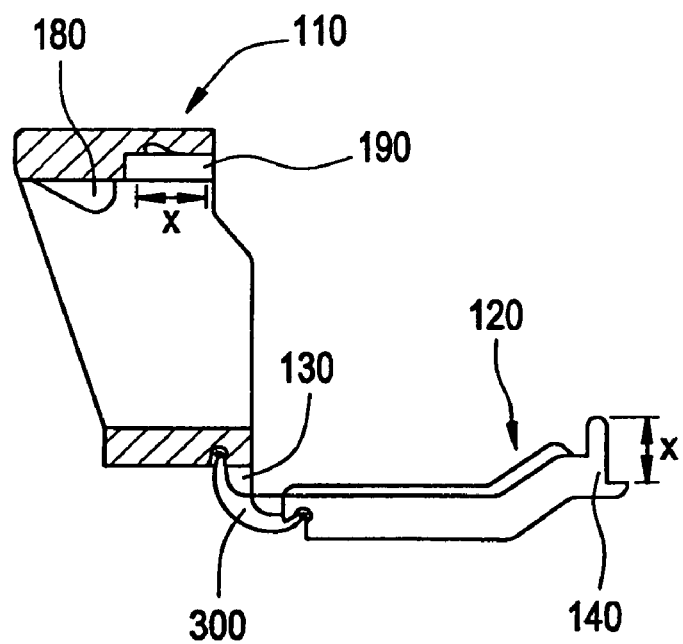
FIG. 10b is a sectional view of the dust shutter having a spring according to the third exemplary embodiment in which the cover is in open position.

In the third exemplary embodiment shown in FIGS. 10a and 10b, a closure spring 300 is disposed between the collar 110 and the cover 120 in order to auto-close the dust shutter 110. However, the invention does not require the use of a closure spring, and the dust shutter 100 without a spring, which allows the cover 120 to remain in the open position, such as the exemplary embodiment shown in FIGS. 1-6b, can be used.

The dust shutters 100 of the exemplary embodiments are configured for use with Class IIIA or lower class lasers. Virtually all of the U.S. domestic standards and international standards divide lasers into four major hazard categories called the laser hazard classifications. The classes are based upon a scheme of graded risk. Lasers are classified as Class IA to Class IV, where the lowest Class IA has a continuous wave (cw) upper power limit of 0.4 mW at visible wavelengths, and the higher power Class IV has a continuous wave power output of 500 mW) Table I below shows the hazards associated with these laser classifications.

Class IIIA (i.e., cw: 1-5 mW) has two different safety labels depending on whether or not the laser beam irradiance exceeds 2.5 mW/cm2 (i.e., caution logotype versus danger logotype). Moreover, shorter wavelengths (e.g., 980 nm) pose more of a risk than longer wavelengths (e.g., 1500 nm) at a same high power level, such as a power greater than 0.5 W.

It is of course understood that departures can be made from the preferred embodiment of the invention by those of ordinary skill in the art without departing from the spirit and scope of the invention that is limited only by the following claims.

TABLE I

LASER CLASSIFICATIONS-SUMMARY OF HAZARDS

| | Applies to | | | | Hazards | | |
|---|---|---|---|---|---|---|---|
| | wavelength rangers | | | Direct | | | |
| Class | UV | VIS | NIR | IR | ocular | Diffuse ocular | Fire |
| I | X | X | X | X | No | No | No |
| IA | — | X* | — | — | Only after 1000 sec | No | No |
| II | — | X | — | — | Only after 0.25 sec | No | No |
| IIIA | X | X** | X | X | Yes | NO | No |
| IIIB | X | X | X | X | Yes | Only when laser output is near Class IIIB limit of 0.5 Watt | No |
| IV | X | X | | X | Yes | Yes | Yes |

Key:
X = Indicates class applies in wavelength range.
*= Class IA applicable to lasers "not intended for viewing" ONLY.
**= CDRH Standard assigns Class IIIA to visible wavelengths ONLY.
ANSI Z 136.1 assigns Class IIIA to all wavelength ranges.

What is claimed is:

1. A dust shutter for an optical adapter, comprising:
   a collar, wherein the collar is capable of being provided around an end of the optical adapter;
   a cover;
   a hinge that comments the cover to the collar; the hinge configured such that the cover can be provided in an open position and a closed position with respect to the collar; and
   a latch provided on the cover that attaches the cover to the collar in the closed position;
   wherein the collar, the cover, the hinge, and the latch form a unitary structure;
   wherein a plurality of ribs are disposed on an inside face of the cover, the plurality of ribs forming a well that provides a seal with the optical adapter.

2. The dust shutter of claim 1, wherein the cover includes a metal label on an inside face of the cover within the well.

3. The dust shutter of claim 1, wherein an inside face of the cover has a low reflectivity.

4. The dust shutter of claim 1, wherein the cover is capable of blocking light up to a class III A category laser.

5. A dust shutter for an optical adapter with a plurality of cavities, comprising:
   a collar, wherein the collar is capable of being provided around an end of the optical adapter;
   a plurality of covers which cover each of the plurality of cavities;
   a plurality of hinges, wherein each of the hinges connects a corresponding cover of the plurality of covers to the collar; each of the hinges configured such the corresponding cover can be provided in an open position and a closed position; and
   a plurality of latches, each of said latches being provided on a corresponding cover of the plurality of covers, and each of said latches attaches the corresponding cover to the collar in the closed position;
   wherein the collar, the covers, the hinges, and the latches form a unitary structure.

6. The dust shutter of claim 5, wherein at least one of the covers comprises a metal label on an inside face of the cover and/or an outside face of the cover.

7. The dust shutter of claim 5, wherein a plurality of ribs are disposed on an inside face of the cover, the plurality of ribs forming a well that provides a seal with the optical adapter.

8. The dust shutter of claim 5, wherein an inside face of the at least one of the covers has a low reflectivity.

9. The dust shutter of claim 5, wherein at least one of the covers is capable of blocking light up to a class III A category laser.

10. A combination, comprising:
    the dust shutter of claim 1; and
    the optical adapter.

11. The combination according to claim 10, wherein:
    the optical adapter includes at least two cavities provided at opposing ends of the optical adapter;
    each of the cavities being configured for connection with a corresponding optical connector;
    at least one end of said optical adapter includes at least one opening provided at at least one of a top and a bottom face of the adapter; and
    wherein the collar covers the at least one opening when the collar is provided around an end of the optical adapter.

12. A combination, comprising:
    at least one optical adapter; and
    at least one dust shutter, each of said at least one dust shutter including
       a collar, wherein the collar is capable of being provided around an end of the at least one optical adapter;
       a plurality of covers;
       a plurality of hinges, wherein each of the hinges connects a corresponding cover of the plurality of covers to the collar; each of the hinges configured such the corresponding cover can be provided in an open position and a closed position; and
       a plurality of latches, each of said latches being provided on a corresponding cover of the plurality of covers, and each of said latches attaches the corresponding cover to the collar in the closed position;
       wherein the collar, the covers, the hinges, and the latches form a unitary structure.

13. The combination of claim 12, wherein the at least one optical adapter comprises at least two optical connectors and the at least one dust shutter comprises at least two dust shutters.

14. The combination of claim 12, wherein the plurality of covers comprises two covers; the plurality of hinges comprises two hinges, and the plurality of latches comprises two latches.

15. The combination of claim 13, wherein the plurality of covers comprises two covers; the plurality of hinges comprises two hinges, and the plurality of latches comprises two latches.

16. The combination of claim 12, wherein the plurality of covers is four covers; the plurality of hinges comprises four hinges, and the plurality of latches comprises four latches.

17. The combination of claim 13, wherein the collar is press fit around the at least two optical adapters.

18. The dust shutter of claim 1, further comprising a spring disposed between the collar and cover.

19. The combination of claim 11, wherein the collar is press fit around the optical adapter.

* * * * *